US012576612B2

(12) United States Patent
Schollier

(10) Patent No.: US 12,576,612 B2
(45) Date of Patent: Mar. 17, 2026

(54) POLYESTER CARPET TILE OR CARPET STRIP, AND PROCESS FOR MANUFACTURING A POLYESTER CARPET TILE OR CARPET STRIP

(71) Applicant: DE POORTERE DECO SA, Mouscron (BE)

(72) Inventor: Bert Schollier, Mouscron (BE)

(73) Assignee: DE POORTERE DECO SA, Mouscron (BE)

( * ) Notice: Subject to any disclaimer, the term of this patent is extended or adjusted under 35 U.S.C. 154(b) by 179 days.

(21) Appl. No.: 18/555,421

(22) PCT Filed: Apr. 14, 2022

(86) PCT No.: PCT/IB2022/053521
§ 371 (c)(1),
(2) Date: Oct. 13, 2023

(87) PCT Pub. No.: WO2022/219579
PCT Pub. Date: Oct. 20, 2022

(65) Prior Publication Data
US 2024/0198630 A1 Jun. 20, 2024

(30) Foreign Application Priority Data
Apr. 16, 2021 (BE) ................................... 2021/5305

(51) Int. Cl.
*B32B 5/26* (2006.01)
*A47G 27/02* (2006.01)
(Continued)

(52) U.S. Cl.
CPC .......... *B32B 5/275* (2021.05); *A47G 27/0275* (2013.01); *B32B 5/022* (2013.01);
(Continued)

(58) Field of Classification Search
CPC ......... B32B 5/275; B32B 5/022; B32B 5/024; B32B 7/12; B32B 37/24; B32B 38/0004;
(Continued)

(56) References Cited

U.S. PATENT DOCUMENTS

| | | | | | |
|---|---|---|---|---|---|
| 6,134,758 | A | * | 10/2000 | Raskin | ..................... D02G 1/12 |
| | | | | | 28/264 |
| 2009/0233040 | A1 | * | 9/2009 | Baumgartner | ............ B32B 5/08 |
| | | | | | 156/60 |
| 2014/0158276 | A1 | * | 6/2014 | Higgins | ................. D05C 17/02 |
| | | | | | 156/60 |

FOREIGN PATENT DOCUMENTS

| | | | |
|---|---|---|---|
| EP | 0176346 | A2 | 4/1986 |
| EP | 3192906 | A1 | 7/2017 |

(Continued)

OTHER PUBLICATIONS

ISR-WO dated Aug. 4, 2022 from parent application PCT/IB2022/053521.

*Primary Examiner* — Nathan L Van Sell
(74) *Attorney, Agent, or Firm* — Vorys, Sater, Seymour and Pease LLP

(57) ABSTRACT

The invention relates to a carpet tile or carpet strip for the contract market, in particular office and commercial buildings, comprising a machine-woven carpet having warp and weft yarns, a needled felt, an intermediate layer between the needled felt and the machine-woven fabric, wherein a polyester synthetic latex coating is applied to the back face of the machine-woven fabric, wherein the synthetic latex coating penetrates into the fabric from the back face of the fabric to a depth of at least 30% of a perpendicular distance between the back face and the front face of the fabric. The invention also relates to a process for manufacturing a carpet tile or a carpet strip for the contract market, in particular office and commercial buildings.

8 Claims, 3 Drawing Sheets

(51) Int. Cl.

| | |
|---|---|
| B32B 5/02 | (2006.01) |
| B32B 7/12 | (2006.01) |
| B32B 37/24 | (2006.01) |
| B32B 38/00 | (2006.01) |
| B32B 38/08 | (2006.01) |

(52) U.S. Cl.

CPC ................ B32B 5/024 (2013.01); B32B 7/12 (2013.01); B32B 37/24 (2013.01); B32B 38/0004 (2013.01); B32B 38/08 (2013.01); *B32B 2037/243* (2013.01); *B32B 2255/02* (2013.01); *B32B 2255/26* (2013.01); *B32B 2260/021* (2013.01); *B32B 2260/046* (2013.01); *B32B 2262/0276* (2013.01); *B32B 2305/073* (2013.01); *B32B 2305/188* (2013.01); *B32B 2307/3065* (2013.01); *B32B 2307/718* (2013.01); *B32B 2367/00* (2013.01); *B32B 2471/02* (2013.01)

(58) Field of Classification Search

CPC .............. B32B 38/08; B32B 2037/243; B32B 2255/02; B32B 2255/26; B32B 2260/021; B32B 2260/046; B32B 2262/0276; B32B 2305/073; B32B 2305/188; B32B 2307/3065; B32B 2307/718; B32B 2367/00; B32B 2471/02; A47G 27/0275; A47G 27/0475; D06N 7/0076; D06N 7/0081; D06N 7/00

See application file for complete search history.

(56) References Cited

FOREIGN PATENT DOCUMENTS

| | | |
|---|---|---|
| EP | 3196344 A | 7/2017 |
| JP | 2005060888 A | 3/2005 |
| WO | 2006021209 A | 3/2006 |
| WO | 2015014335 A | 2/2015 |
| WO | 2022219579 A1 | 4/2022 |

* cited by examiner

POLYESTER CARPET TILE OR CARPET STRIP, AND PROCESS FOR MANUFACTURING A POLYESTER CARPET TILE OR CARPET STRIP

TECHNICAL FIELD

The invention relates to a carpet tile or carpet strip for the contract market, in particular office and commercial buildings.

The invention relates, in a second aspect, to a method for manufacturing a carpet tile or a carpet strip for the contract market, in particular office and commercial buildings.

The invention relates, in a third aspect, to a use of a method according to the second aspect for the manufacture of a carpet tile or a carpet strip according to the first aspect.

PRIOR ART

Carpets are well known as floor covering and are often used as floor covering in large spaces in office and commercial buildings. It is usual to provide carpet tiles or carpet strips. The carpet tiles are cut in advance into rectangles or squares and are attached to a floor area on-site in a juxtaposed manner. In some cases, carpet strips are obtained by cutting wider carpet rolls longitudinally. The carpet strips are unrolled on-site, juxtaposed on a floor surface. Often, it is necessary to cut the carpet tiles or the carpet strips to fit on-site. This is for example necessary for the installation of carpet tiles or carpet strips in corners or edges of a space. In office or commercial buildings, it is not unusual to cut shapes out from a carpet tile or carpet strip during or after installation. This may for example be necessary when a plug or access to the additional network is to be installed in a floor area in an office or commercial building, for which a recess is required in a carpet tile or carpet strip.

Carpet tiles or carpet strips in office or commercial buildings receive heavy loads. Each day, many people walk on carpet tiles or carpet strips. This requires that carpet tiles or carpet strips for the contract market have high wear resistance. The layout of office or commercial buildings may also often change. Spaces may be refurnished for other purposes. Carpet tiles or carpet strips can then preferably easily be installed, replaced and recycled.

Because of the flexible arrangement of office or commercial buildings, a raised floor is often chosen above the true floor surface. In the space between the true floor surface and the raised floor, there is space for all utilities. Because of this raised floor, it is recommended to use lightweight carpet tiles or carpet strips to relieve the load on the raised floor as much as possible. In addition, lightweight carpet tiles or carpet strips are more ergonomic for the installer to carry.

In office or commercial buildings, there are often strict requirements for fire safety, wherein it is required that carpet tiles or carpet strips are flame retardant. Carpet tiles or carpet strips must at least meet the requirements for the classification Cfl-s1 according to the EN 13501-1 2007 fire standard.

Other standards that must be adhered to are the EN 15114 standard for determining shear strength, the EN 985 standard regarding the office chair test method, the ISO 6356 standard regarding static electricity propensity in textile and laminate floor coverings, the ISO 2551 standard for determining dimensional changes due to the effects of varied water and heat conditions.

EP 0 176 346 describes a carpet tile. The carpet tile comprises a primary carpet base with pile yarns that rise therein, a foam base layer below the primary carpet base, a thermoplastic material attaching the primary carpet base to the foam base layer, wherein the thermoplastic material has an integrated layer of stabilizing material and wherein the foam base layer comprises a support material and a high density foam, laminated on the support material.

EP 0 176 346 has a number of disadvantages. In the case of such a carpet tile, the primary carpet base comprises a tufted carpet or a bonded carpet wherein the pile yarns are bonded in a PVC or hot-melt glue. During the custom cutting or the cutting of shapes out of a carpet tile during installation, the layer containing the pile yarns is damaged at the cut edge in both a tufted carpet and a bonded carpet. Some pile yarns detach at the edge and the carpet tile will fray at the cut edge. This causes clearly visible joints and degradation of the carpet tile.

The use of pile yarns offers a thick and pleasant primary carpet base. The disadvantage is that pile yarns are less suitable for use in circumstances wherein the carpet is heavily loaded, such as for example in office and commercial buildings. Pile yarns become worn quickly due to frequent walking on the carpet and make it harder to use carts to transport, for example, folders.

The foam base layer and the use of the thermoplastic material result in a carpet tile according to EP 0 176 346, which is heavy. Only these two layers can together offer a carpet tile with a weight of 2900 g/m$^2$. This is a heavy load for a raised floor. The use of a foam base layer comprising a support material and a thermoplastic material with an integrated layer of stabilizing material, wherein different materials are used, makes it harder to recycle the carpet tiles. This is a great disadvantage considering that carpet tiles in office and commercial buildings are often replaced. Tufting or bonding the pile yarns potentially makes the recycling of the pile yarns complex or partially impossible.

Finally, a foam base layer is highly flammable, which makes it less suitable for use in office and commercial buildings.

The present invention aims at least at offering a solution to solve these drawbacks.

SUMMARY OF THE INVENTION

In a first aspect, the present invention relates to a device according to claim 1.

The advantage of such a carpet tile or carpet strip is that a polyester synthetic latex coating is applied to the back face of the machine-woven fabric, wherein the synthetic latex coating is penetrated into the fabric from the back face of the fabric to a depth of at least 30% of a perpendicular distance between the back face and the front face of the fabric. When the carpet tile or carpet strip is custom-cut during installation or during the cutting of shapes from the carpet tile or the carpet strip, at least the warp yarns remain bonded to each other, so that the strength of the carpet tile or of the carpet strip is retained and the carpet tile or carpet strip is less frayed on the cut edge. This advantage also applies during the cutting of carpet tiles or carpet strips during the production process. Because the synthetic latex coating is penetrated into the fabric from the back face to a depth of at least 30% of a perpendicular distance between the back face and the front face of the fabric, at least part of the weft yarns are also bonded to the warp yarns, so that, during cutting, the risk of fraying the weft yarns of the fabric is reduced. Another advantage is that, during the cutting of a carpet tile or a carpet strip in a direction transverse to the warp yarns, a limited portion of the warp yarns is not bonded by the synthetic latex coating at a cut edge. This portion may optionally stand up and form a visible cut edge. Because the synthetic latex coating is penetrated into the fabric from the back face to a depth of at least 30% of a perpendicular distance between the back face and the front face of the fabric, this part is minimal and no clearly visible cut edges are formed by the standing warp yarns.

A second advantage is that the fabric per se is already quite strong and has good dimensional stability, so that it frays less quickly in the event of a load following numerous movements in the office or commercial building and by carts. The warp yarns and consequently also the weft yarns have a mutual limited freedom of movement thanks to the synthetic latex coating, which increases the wear resistance. The penetration of the synthetic latex coating into the fabric reduces the freedom of movement of the weft yarns relative to one another and relative to the warp yarns.

Because the fabric is already reinforced thanks to the synthetic latex coating, it is not necessary to use a heavy intermediate layer to reinforce the fabric and to laminate the fabric and the needled felt. A lighter intermediate layer can be used to laminate only the fabric and the needled felt. This leads to a reduction in weight per surface unit for the carpet tile or carpet strip. Since the glue must not be partially mixed with the warp and weft yarns, it is easier to separate and recycle the fabric and the needled felt.

In addition, the invention uses flame-retardant polyester for both the fabric and the needled felt. Therefore, the carpet tile or carpet strip meets the FAR 25.853 standard regarding flammability.

The carpet tile or carpet strip also at least meets the requirements for the classification Cfl-s1 according to the EN 13501-1 2007 fire standard. Furthermore, there is an additional advantage that, after using only polyester, the fabric, its synthetic latex coating, and the needled felt can be recycled simultaneously. If the synthetic latex coating is not made of polyester, it is necessary to separate the synthetic latex coating from the fabric in order to recycle the carpet tiles or the carpet strips, which is not practically feasible.

Preferred embodiments of the device are described in the claims.

In the intermediate layer, the polyester is also used as adhesive to laminate the fabric and the needled felt. This improves recycling even further. Now, it is even no longer necessary to separate the fabric and the needled felt. The intermediate layer may even be treated and recycled together with the fabric and the needled felt.

Because, before the fabric and the needled felt are laminated, a polyester synthetic latex coating is applied to the back face of the machine-woven fabric, wherein the synthetic latex coating penetrates the fabric from the back face of the fabric to a depth of at least 30% of a perpendicular distance between the back face and the front face of the fabric, said method has, among other things, the advantage that, when cutting into carpet tiles or carpet strips, the carpet tiles or carpet strips will fray less at the cut edge. In addition, a fabric is obtained that is strong enough and that has dimensional stability. The fabric may be laminated to the needled felt with a light intermediate layer and the fabric and the needled felt can easily be separated subsequently to be recycled.

When cutting into carpet tiles or carpet strips, a portion of the warp and weft yarns are then at least partially melted mutually on the edge of the carpet tiles or the carpet strips. This further strengthens the cut edge and further reduces the cut-edge fraying.

In a third aspect, the present invention relates to the manufacture of a carpet tile or carpet strip according to the first aspect, using a method according to the second aspect.

DETAILED DESCRIPTION

Figure 1:
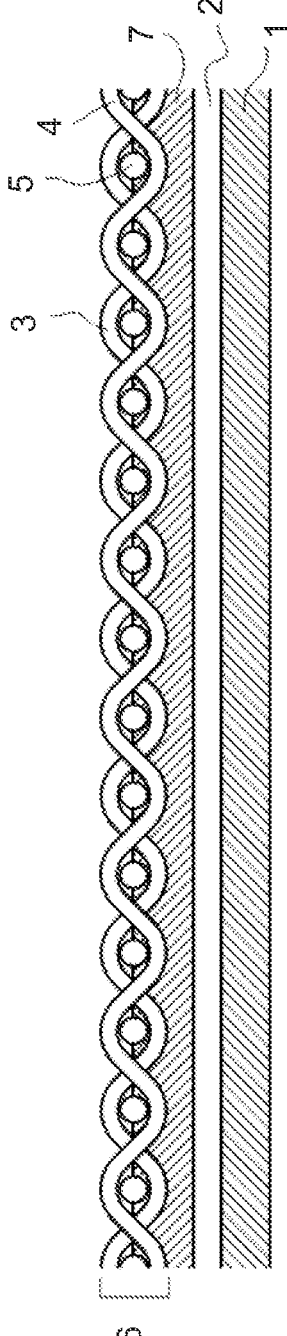
FIG. 1 shows a cross-sectional view of one embodiment of the present invention.

Unless otherwise mentioned, all terms used in the description of the invention, including technical and scientific terms, are used in the sense as generally understood by the person skilled in the art in the technical field of the invention. For a better understanding of the description of the invention, the following terms are explained explicitly.

"A" and "the" in this document refer to both the singular and the plural except where the context clearly assumes otherwise. "A segment", for example, means one or more segment(s).

The terms "comprise", "comprising", "compose of", "composed of", "provided with", "have", "having", "contain", "containing" are synonyms and are inclusive or open terms indicating the presence of what follows, and do not exclude or prevent other components, features, elements, members, steps, known from or described in the prior art.

The citation of numerical intervals by means of endpoints comprises all integers, fractions, and/or real numbers between the endpoints, inclusive of these endpoints.

The term "thermoplastic" refers to a polymeric material that can be folded, petri- or liquefied above a specific temperature and which substantially hardens after cooling. Examples of thermoplastic polymers comprise, but are not limited to, vinyl comprising thermoplastics: such as polyvinyl chloride, polyvinyl acetate, polyvinyl alcohol and other vinyl and vinylidene resins and copolymers thereof; polyethylene compounds: such as low-density polyethylene and high-density polyethylene and copolymers thereof; styrene compounds: such as ABS, SAN and polystyrenes and copolymers thereof, polypropylene and copolymers thereof; saturated and non-saturated polyesters; acrylic; polyamides; engineering plastics such as acetyl, polycarbonate, polyimide, polysulfone, polyphenylene oxide, sulfide resins, and the like.

The term "float" refers to a section of a yarn appearing on the surface of a fabric. Floats may be upper floats and/or lower floats. The term "upper float" refers to a section of a yarn appearing above the surface of a fabric. An upper float is formed by a connecting pattern with a warp:weft bonding density of 2:1, 3:1, 4:1, 5:1, 6:1, 7:1, 8:1, 9:1, 10:1 or more. This means that each weft yarn floats above at least two warp yarns, above at least 3 warp yarns, etc. Alternatively, each warp yarn floats above at least two weft yarns, above at least 3 weft yarns, etc. The term "lower float" refers to a section of a yarn that appears below a fabric. A lower float is formed by a connecting pattern with a warp:weft bonding density of 1:2, 1:3, 1:4, 1:5, 1:6, 1:7, 1:8, 1:9, 1:10 or less. This means that each weft yarn floats below at least two warp yarns, below at least 3 warp yarns, etc. Alternatively, each warp yarn floats below at least two weft yarns, below at least 3 weft yarns, etc. The term "bonding" is used to refer to weaving warp yarns with weft yarns in order to form a fabric.

The term "weft float" refers to a float that is formed by weft yarns. The term "warp float" refers to a float that is formed by warp yarns.

The yarn number returns to the yarn thickness. The measurement is indicated as the ratio between the weight and length of a yarn part. During weight numbering, the weight of a fixed yarn length is determined. During length numbering, the length of a fixed yarn length is determined. Tex is an example of weight numbering, wherein tex indicates weight in grams of 1000 m of yarns. Dtex is used more often, which is the weight in grams of 10,000 m of yarns. Another example of weight numbering is denier, or den for short, wherein the weight in grams of 9000 m of wires is indicated. For yarns comprising filaments, denier numbering is also used for filaments. Denier per filament or DPF refers to the weight number of a filament of the yarn.

The term "fraying" is used here to describe the phenomenon that the yarns at the lateral sides of a carpet detach and become clearly visible visually. Cutting a carpet causes a high risk of fraying. Indeed, during the cutting, yarns and/or bonds between the yarns are cut; consequently, yarns at the cutting plane can detach more easily and become clearly visible visually.

In a first aspect, the invention relates to a carpet tile or carpet strip for the contract market, more particularly office and commercial buildings.

According to one embodiment, the device comprises a machine-woven fabric, comprising a front face as a usage surface and a back face, comprising flame-retardant polyester warp and weft yarns, a needled felt of flame-retardant polyester, an intermediate layer between the needled felt and the machine-woven fabric, wherein a polyester synthetic latex coating is applied to the back face of the machine-woven fabric. The synthetic latex coating is penetrated into the fabric from the back face of the fabric to a depth of at least 30% of a perpendicular distance between the back face and the front face of the fabric.

The fabric comprises a front face and a back face. The front face is the usage surface on which people in an office or commercial building walk and on which carts roll. After installation, it is the visible part of the carpet tile or carpet strip.

A fabric has the advantage over the tufted carpet that a base, such as a fabric or a needled felt, is not required, whereby a pile yarn is pierced. By the absence of base in a fabric, the weight can be reduced relative to the tufted carpet. In addition, tufted carpets often have long piles, which hinders rolling with carts. In addition, long-pile carpets therefore wear more quickly.

The fabric is preferably a smooth fabric. A smooth fabric is a pile-free fabric. A pile fabric has the same disadvantage as a tufted carpet with long piles during the use of carts. A pile fabric will be again faster. A second disadvantage of the pile fabrics is that besides the pile yarn that is used to form the piles, the warp yarn also comprises additional yarns for bonding the piles. Therefore, the fabric becomes heavier compared to a smooth fabric.

The fabric comprises flame-retardant polyester warp and weft yarns. The flame-retardant polyester comprises at least 90% polyester and at least 1% flame-retardant components. Polyester is very strong, is rigid, has good resistance to deformation and little creep. It is therefore appropriate for application when heavy loads are in use. The yarn is not harmed by mold and bacteria. This is advantageous because, for example, in an office or commercial building, coffee or another beverage can be spilled, which can lead to mold and bacteria. Polyester absorbs almost no liquids. It is very resistant to acids, to oxidation means and to dilute alkaline detergents. It can be sterilized using steam. By virtue of these features, the fabric is appropriate to be cleaned efficiently and rapidly. This is advantageous for an office or commercial building, as limited time is available for a cleaning team.

Flame-retardant polyester has excellent heat resistance. It is difficult for it to catch fire, it extinguishes flames and generates limited fumes. By virtue of these features, it is possible to meet at least the requirements for the classification Cfl-s1 according to the EN 13501-1 2007 fire standard.

Flame-retardant polyester has excellent heat resistance. It is difficult for it to catch fire, it extinguishes flames and generates limited fumes. By virtue of these features, it is possible to meet the FAR 25.853 standard regarding flammability.

The carpet tile or carpet strip comprises a needled felt of flame-retardant polyester. The needled felt comprises at least 90% polyester fibers and at least 1% flame-retardant component fibers. Therefore, the needled felt meets at least the requirements for the classification Cfl-s1 according to the EN 13501-1 2007 fire standard.

The carpet tile or carpet strip comprises a needled felt of flame-retardant polyester. Therefore, the needled felt meets the FAR 25.853 standard regarding flammability.

The needled felt is a nonwoven textile. The needled felt has a thickness of 1 mm to 8 mm, preferably 1 mm to 6 mm, more preferably 1 mm to 5 mm and even more preferably 1 mm to 4 mm.

The needled felt is attached to the back face of the fabric using the intermediate layer. The needled felt is suitable for mechanically reinforcing the fabric. It is appropriate to offer rigidity to the carpet tile or carpet strip at cut edges, to give high dimensional stability to the carpet tile or carpet strip, to increase the comfort of walking on the carpet tile or carpet strip and to improve acoustics in an office or commercial building by sound absorption and by decreasing contact noise when walking.

Because the needled felt is a nonwoven textile, the carpet tile or the carpet strip is suitable for being installed and replaced quickly in an office or commercial building. The carpet tile or carpet strip can be attached to a raised floor or floor surface by means of velcro strips. The velcro strips are glued onto the floor surface or raised floor. The hooks of the velcro strip fit into the threads of the needled felt, so that the carpet tile or carpet strip is immobilized. The carpet tile or carpet strip can easily be removed by pulling off the carpet tile or carpet strip from the velcro strip. The velcro strips are reusable and remain adhered to the raised floor or floor surface. A new carpet tile or carpet strip according to the invention can easily be installed by pressing the new carpet tile or carpet strip to the already present velcro strips, so that the new carpet tile or carpet strip is immobilized. It is clear for the person skilled in the art that the carpet tile or carpet strip according to the present invention can also be installed by means of glue, a double-sided adhesive or simply detached from the raised floor or floor surface.

A velcro strip is preferably made of fire-proof equipment and meets the FAR 25.853 (a)(1)(ii) standard regarding flammability. A non-limited example of a suitable material is polyamide PA6. The weight is preferably less than 0.60 $kg/m^2$, more preferably less than 0.55 $kg/m^2$, even more preferably less than 0.55 $kg/m^2$ and even more preferably less than 0.45 $kg/m^2$. The velcro strip comprises hooks on one face of the strip, configured to attach the yarns, and on the opposite face, an adhesive. The adhesive has an adhesion strength of at least 10.0 N/cm, preferably of at least 12.0 N/cm and even more preferably of at least 13.0 N/cm. The force required to rip the carpet tile off the hooks of the velcro strip is at least 0.60 N/cm, preferably at least 0.70 N/cm and even more preferably at least 0.80 N/cm. The shear force of the velcro strip is at least 20 N/cm$^2$, preferably at least 25 N/cm$^2$ and even more preferably at least 29 N/cm$^2$. The loop tension is at least 5 N/cm$^2$, preferably at least 7 N/cm$^2$ and even more preferably at least 8 N/cm$^2$. A non-limited example of a suitable velcro strip is HTH 577 from the company Velcro.

The fabric has a weight of at most 800 g/m$^2$. The synthetic latex coating has a weight of at most 350 g/m$^2$. The needled felt has a weight of at most 1000 g/m$^2$. The intermediate layer has a weight of at most 350 g/m$^2$. The total weight of a carpet tile or carpet strip is thus at most 2500 g/m$^2$. A standard carpet tile or carpet strip can weigh up to 3000 g/m$^2$ or even more. This makes a carpet tile or carpet strip according to the invention suitable for use in an office or commercial building, in particular on a raised floor. The carpet tile or carpet strip is also more ergonomic for the installer to carry.

On the back face of the machine woven fabric, a polyester synthetic latex coating is applied. The synthetic latex coating is penetrated into the fabric from the back face of the fabric to a depth of at least 30% of a perpendicular distance between the back face and the front face of the fabric. A perpendicular distance means a distance that is measured perpendicular to the usage plane.

The synthetic latex coating is preferably penetrated into the fabric to a depth of at least 40% of a perpendicular distance between the back face and the front face of the fabric, more preferably at least 50%, even more preferably at least 55% and most preferably at least 60%. A depth of at least 30% of the perpendicular distance between the back face and the front face of the fabric is advantageous for connecting at least part of the weft yarns to the warp yarns and also offers a strong bond for the warp yarns.

The synthetic latex coating is penetrated into the fabric to a depth of at most 80% of a perpendicular distance between the back face and the front face of the fabric, more preferably at most 75%, even more preferably at most 70% and most preferably at most 65%. Therefore, the synthetic latex coating remains invisible to the front face of the fabric.

When the carpet tile or carpet strip is custom-cut during installation or during the cutting of shapes from the carpet tile or the carpet strip, at least the warp yarns remain bonded to each other, so that the strength of the carpet tile or of the carpet strip is retained and the carpet tile or carpet strip is less frayed on the cut edge. This advantage also applies during the cutting into carpet tiles or carpet strips during the production process. Because the synthetic latex coating is penetrated into the fabric from the back face to a depth of at least 30% of the perpendicular distance between the back face and the front face of the fabric, at least part of the weft yarns are also bonded to the warp yarns, so that during cutting, the risk of fraying the weft yarns of the fabric is reduced. A further advantage is that, during the cutting of a carpet tile or a carpet strip in a direction transverse to the warp yarns, a limited portion of the warp yarns is not bonded by the synthetic latex coating at the cut edge. This portion may optionally stand up and form a visible cut edge. Because the synthetic latex coating is penetrated into the fabric from the back face to a depth of at least 30% of the perpendicular distance between the back face and the front face of the fabric, this part is minimal and no clearly visible cut edges are formed by the standing warp yarns.

Because a synthetic latex coating is applied to the back face of the fabric, the warp yarns and consequently also the weft yarns have limited freedom of movement relative to one another. Under such circumstances, there is less friction mutually between the yarns and therefore also less wear. This reinforces the fabric and the carpet tile or carpet strip. The penetration of the synthetic latex coating into the fabric also reduces the freedom of movement of the weft yarns relative to one another and relative to the warp yarns.

Because the fabric is already reinforced thanks to the synthetic latex coating, it is not necessary to use a heavy intermediate layer to reinforce the fabric and to laminate the fabric and the needled felt. A lighter intermediate layer can be used to laminate only the fabric and the needled felt. This results in a reduction in weight per surface unit for the carpet tile or carpet strip. Since the glue must not mix partially with the warp and weft yarns, it is easier to separate the fabric and the needled felt and recycle them.

According to one embodiment, the synthetic latex coating has a weight of at most 350 g/m$^2$, preferably at most 325 g/m$^2$, more preferably at most 300 g/m$^2$, even more preferably at most 275 g/m$^2$ and even more preferably at most 250 g/m$^2$.

The weight of the synthetic latex coating is preferably as low as possible to limit the weight of the carpet tile or the carpet strip. Furthermore, enough synthetic latex coating must be applied to mutually bond the warp yarns and also the weft yarns. A synthetic latex coating with a weight of at most 350 g/m$^2$ is then sufficient.

According to one embodiment, the fabric has a smooth bond. In a smooth bond, each weft yarn extends alternately above and below a warp yarn and each warp yarn extends alternately above and below a weft yarn. This is the simplest bond and as strong as possible. The daily heavy load on the fabric from the people moving through an office or commercial building and from carts can tear the warp and weft yarns and reduce dimensional stability. A strong bond is advantageous to avoid this. Additionally, a strong bond will guarantee that the warp and weft yarns will be less mobile relative to one another under the influence of the load from people moving through an office or commercial building and carts, so that there is less friction between the yarns, and, consequently, less wear. This does not have an influence on the wear of the yarns due to friction with, for example, the shoes of walking people and the wheels of carts.

According to another embodiment, the connection in the fabric is a weft rep. Each weft yarn extends alternately above and below two juxtaposed warp yarns and each warp yarn alternately above and below a weft yarn. This offers a different visual effect than during a smooth bond. Because the weft yarn extends only above or below two juxtaposed warp yarns during a weft rep, this is always a strong bond.

The fabric preferably has a limited number of floats, both upper and lower floats. Floats can be used in combination with yarns of different color to weave patterns, emblems or symbols in the fabric. The disadvantage of the use of floats is that it introduces a deflection of a smooth connection and therefore weakens the connection in the fabric locally. Floats preferably have a bond density of less than or equal to 5:1 and greater than or equal to 1:5, more preferably a bond density of less than or equal to 3:1 and greater than or equal to 1:3, and even more preferably a bond density of less than or equal to 2:1 and greater than or equal to 1:2.

According to one embodiment, the fabric is a Jacquard fabric. A Jacquard fabric comprises complex patterns and/or emblems which cannot be woven using frames on a loom. Weaving with frames means that all the warp yarns that have passed through the same frame are located at each weft yarn in the fabric either on one side or on the other side of the weft yarn. A Jacquard fabric is woven using a Jacquard loom. Jacquard means that an individual warp yarn is located in a position on either side of the weft yarn, independent of the position of the other warp yarns.

According to one embodiment, some of the warp and weft yarns are at least partially melted onto one another on the edge of the carpet tiles or carpet strips. For this purpose, the warp and weft yarns are thermoplastic yarns. This further strengthens the cut edge and further reduces the cut-edge fraying. It is not necessary to reinforce the edges of the carpet tiles or carpet strips with a stitch or a layer of additional glue or a covering on the edge, so that the weight is reduced.

Preferably, in at least 10% of the crossings between the weft and warp yarns, more preferably in at least 20% of the crossings between the weft and warp yarns, even more preferably in at least 30% of the crossings between the weft and warp yarns and still more preferably in at least 50% of the crossings between the weft and warp yarns, the weft and warp yarns are melted to one another.

According to one embodiment, the yarn number of the warp and weft yarns is from 1100 dtex to 4400 dtex.

An higher yarn number means a heavier and thicker yarn. A high yarn number is indicated for heavy and strong fabrics with high dimensional stability. A low yarn number is indicated for light and flexible fabrics. A carpet tile or a carpet strip is preferably lightweight, strong and maintains its shape under the daily load of people moving in an office or commercial building. A yarn number from 1100 dtex to 4400 dtex, preferably from 1500 dtex to 3700 dtex and even more preferably from 1800 dtex to 3300 dtex is indicated for a carpet tile or carpet strip. The carpet tile or carpet strip is then sufficiently lightweight and strong.

According to one embodiment, the weft and warp yarns comprise filaments. The filament has a weight number of 2 DPF to 35 DPF.

Preferably, the filament has a weight number of at least 5 DPF, more preferably of at least 10 DPF, even more preferably of at least 15 DPF and still more preferably of at least 20 DPF.

Preferably, the filament has a weight number of at most 34 DPF, more preferably of at most 33 DPF, even more preferably of at most 32 DPF and still more preferably of at most 31 DPF.

A filament with a high weight number is advantageous because a warp or weft yarn then comprises less filaments. The more filaments a warp or weft yarns comprises, the higher the risk that a warp or weft yarn frays or unravels at a cut edge, so that a cut edge is visible more clearly.

According to one embodiment, the weft and warp yarns are so-called filament yarns and the yarns comprise continuous filaments.

According to another embodiment, the weft and warp yarns are so-called filament yarns and the yarns comprise continuous filaments, wherein the texture of the yarns is modified using air jets, wherein small loops are formed. This offers additional insulation and resistance.

According to one embodiment, the number of warp yarns per cm of fabric is between 6 and 30 and the number of weft yarns per cm of fabric is between 3 and 10.

The number of warp yarns per cm of fabric also determines the density of the fabric. A denser fabric will be stronger and will have more dimensional stability, but it will also be heavier. In the event of a smaller number of warp yarns per cm of fabric, the fabric is lighter and flexible, but it will be less strong and will have less dimensional stability. The number of warp yarns per cm of fabric is from 6 to 30, preferably from 13 to 25, even more preferably from 15 to 20. The carpet tile or carpet strip is then sufficiently light-weight and strong.

The number of weft yarns per cm of fabric also determines the density of the fabric. A denser fabric will be stronger and will have more dimensional stability, but it will also be heavier. In the event of a smaller number of weft yarns per cm of fabric, the fabric is lighter and flexible, but it will be less strong and will have less dimensional stability. The number of weft yarns per cm of fabric is from 3 to 10, preferably from 3 to 8, even more preferably from 3 to 7. The carpet tile or carpet strip is then sufficiently lightweight and strong.

According to one embodiment, the weight per unit area of the carpet tile or carpet strip is at most 2500 g/m$^2$.

The weight of the carpet tile and the carpet strip is determined by the weight of the fabric, of the synthetic latex coating, of the intermediate layer and of the needled felt. The weight of the carpet tile or the carpet strip can be optimized by carefully choosing the fabric, the synthetic latex coating, the intermediate layer and the needled felt. Heavier fabric is itself already stronger and requires a thinner needled felt for good dimensional stability. Because a synthetic latex coating is applied to the back face of the machine-woven fabric, the intermediate layer is minimal. The intermediate layer is the bond between the fabric and the needled felt. A lighter fabric requires a slightly thicker needled felt for good dimensional stability. The intermediate layer can always be minimal. By virtue of properly choosing the thickness of the fabric, which is among other things determined by the yarn number, the number of warp yarns per cm of fabric and the number of weft yarns per cm of fabric, properly choosing the weight of the synthetic latex coating and properly choosing a suitable needled felt, the weight of the carpet tile or of the carpet strip is at most 2500 g/cm$^2$, preferably at most 2400 g/cm$^2$, even more preferably at most 2300 g/cm$^2$ and still more preferably 2250 g/cm$^2$.

According to one embodiment, the machine-woven fabric and the needled felt are laminated together using the intermediate layer.

The machine-woven fabric and the needled felt are bonded together. The needled felt offers dimensional stability and reinforces the fabric because it is bonded to the fabric. The fabric and the needled felt are laminated together using the intermediate layer.

According to one embodiment, the intermediate layer comprises the polyester adhesive.

By using the polyester as an adhesive, the carpet tile or the carpet strip can be easily recycled. Both the fabric, the synthetic latex coating, the needled felt and the adhesive in the intermediate layer comprise polyester, so that the carpet tile or the complete carpet strip can be recycled together. It is not necessary to separate the fabric, the synthetic latex coating and the needled felt. The polyester adhesive is for example a polyester hot-melt self-adhesive film, a polyester hot-melt powder or another suitable alternative.

According to one embodiment, the carpet tile or the carpet strip comprises a polyester membrane between the machine-woven fabric and the intermediate layer.

The membrane is also a nonwoven textile. The membrane comprises at least 90% polyester fibers and at least 1% flame-retardant component fibers. The membrane is very thin. The thickness of the membrane is at most 0.5 mm, preferably at most 0.3 mm, even more preferably at most 0.2 mm, and even more preferably at most 0.1 mm. The weight of the membrane is at most 150 g/m², preferably at most 100 g/m², even more preferably at most 50 g/m², and even more preferably at most 40 g/m².

A polyester membrane guarantees the complete recycling of the carpet tile or carpet strip.

Because of the limited dimensions of a carpet tile, the dimensional stability of the machine woven fabric can be more limited than that of a carpet. Therefore, it is possible that a carpet tile narrows after installation, which causes the joints visible between the carpet tiles. This is also the case for a carpet strip in a direction transverse to the longitudinal direction of the belt. Following the narrowing of a carpet strip after installation, the passages between the carpet strips become more visible. A membrane between the machine-woven fabric and the intermediate layer is suitable for increasing the dimensional stability of the carpet tile or carpet strip in all directions parallel to the surface of use of the carpet tile or carpet strip.

According to one embodiment, the warp yarns comprise at least one series of tension warps and one series of bonding warps. The tension warps and the bonding warps have a different length per unit length of the fabric. A unit of length of the fabric is in the direction of the warp yarns. A ratio of the length of the bonding warps relative to the length of the tension warps per unit of length of the fabric is greater than 1.20, preferably greater than 1.35 and even more preferably greater than 1.50. The bonding warps bind the weft yarns. The tension warps are greater compared to the bonding warps and offer a structure wherein the synthetic latex coating is penetrated from the back face of the fabric guaranteed to at least 50% of the depth of the fabric. Therefore, during the cutting of the carpet tiles or carpet strips in a transverse direction on the warp yarns, a portion of the warp yarns will be very limited to a cut edge, more particularly the bonding warps, which is not bound by the synthetic latex coating. This portion may optionally stand up and form a visible cut edge. Following the use of the bonding warps and the tension warps, this is minimal and no visible cut edges are formed by the straightened warp yarns.

In a second aspect, the invention relates to a method for manufacturing a carpet tile or a carpet strip for the contract market, in particular office and commercial buildings.

According to one embodiment, the method comprises the steps of machine-weaving a fabric, comprising a front face as a use surface and a back face, comprising flame-retardant polyester warp and weft yarns, the manufacture of a needled felt of flame-retardant polyester, the lamination of the needled felt to the fabric using an intermediate layer, the lamination to the carpet tiles or carpet strips, wherein the method comprises the additional step before lamination of the application of a synthetic latex coating to the back face of the machine-woven fabric, wherein the synthetic latex coating penetrates the fabric from the back face of the fabric to a depth of at least 30% of a perpendicular distance between the back face and the front face of the fabric.

The machine-weaving of the fabric using a weaving machine is known from the prior art.

The formation of a needled felt from filaments is known from the prior art. This can be done in two ways: a continuous method and a discontinuous method. In the case of the continuous method, filaments are formed directly in an uninterrupted process by extrusion from grains, a needled felt is formed, and the filaments are bonded in the needled felt. In the case of the discontinuous method, the filament yarns are carried out on a needled felt machine from coils.

Here, the filament yarns are opened, converted into the desired shape of needled felt and then bonded. Preferably, a mechanical method is used for bonding filaments in the needled felt. One example is needling the needled felt using needles with barbs. By needling, the filaments are mixed, but there are also many detached filament ends or loops that can hook into the hooks of the velcro strip using the velcro strip when attaching to a floor surface or raised floor. The chemical reinforcement of the needled felt is less preferred since this can have an influence on the recycling of the needled felt. The thermal reinforcement of the needled felt can reduce the number of detached loops or filament ends which can be hooked by the hooks of a velcro strip.

The needled felt is laminated to the fabric.

Before the lamination step, a polyester synthetic latex coating is applied to the back face of the machine-woven fabric. The synthetic latex coating is preferably applied by means of a lick roller and a scraper. Preferably, after the application of the synthetic latex coating, the fabric is driven between two pivotable rollers. A distance between the two pivotable rollers is preferably adjustable. The two pivotable rollers exert more or less pressure on the fabric and the synthetic latex coating depending on the distance between them. Due to the pressure on the fabric and the synthetic latex coating, the synthetic latex coating penetrates the fabric from the back face of the fabric. The synthetic latex coating penetrates into the fabric from the back face of the fabric to a depth of at least 30% of a perpendicular distance between the back face and the front face of the fabric.

The synthetic latex coating preferably penetrates into the fabric to a depth of at least 40% of the perpendicular distance between the back face and the front face of the fabric, more preferably at least 50%, even more preferably at least 55% and most preferably at least 60%. A depth of at least 30% of the perpendicular distance between the back face and the front face of the fabric is advantageous for bonding at least part of the weft yarns to the warp yarns and also offers a solid bond for the warp yarns.

The synthetic latex coating penetrates into the fabric to a depth of at most 80% of a perpendicular distance between the back face and the front face of the fabric, more preferably at most 75%, even more preferably at most 70% and most preferably at most 65%. This way, the synthetic latex coating remains invisible to the front face of the fabric.

This method is advantageous because, during cutting into carpet tiles or carpet strips, carpet tiles or carpet strips will fray less than the cut edge. In addition, a fabric is obtained which is rather solid and dimensionally stable. The fabric may be laminated with a light intermediate layer with the needled felt and the fabric and the needled felt can then easily be separated to be recycled.

According to one embodiment, the lamination comprises the use of polyester as an adhesive in the intermediate layer. This is advantageous for easy recycling of the carpet tiles or carpet strips.

According to one embodiment, a polyester hot-melt self-adhesive film is used during lamination. The fabric, on which a synthetic latex coating is applied to the back face, is unrolled from a first roller, the polyester hot-melt self-adhesive film from a second roller and the needled felt from a third roller. The fabric, the self-adhesive film and the needled felt are assembled, wherein the self-adhesive film touches the back face of the fabric and the needled felt. The whole is heated, so that the polyester hot-melt self-adhesive film becomes sticky, and strongly pushes against one another between two rollers. After cooling, the fabric and the needled felt are assembled by the self-adhesive film. The self-adhesive film forms an intermediate layer.

According to one embodiment, a polyester hot-melt powder is used during lamination. The fabric, on which a synthetic latex coating is applied to the back face, is unrolled from a first roller and the needled felt from a second roller. The polyester hot-melt powder is dispensed using an appropriate dispenser through either the back face of the fabric or through a face of the needled felt either through the back face of the fabric and through a face of the needled felt. The fabric and the needled felt are assembled, wherein the back face of the fabric is oriented toward the needled felt and the polyester hot-melt powder is between the fabric and the needled felt. The whole is heated, so that the hot-melt powder becomes sticky, and strongly pushes against one another between two rollers. After cooling, the fabric and the needled felt are assembled using the polyester hot-melt powder. The polyester hot-melt powder forms an intermediate layer.

According to one embodiment, the cutting into carpet tiles or carpet strips comprises the at least partial melting of a portion of the warp and weft yarns at the edge of the carpet tiles or the carpet strips. For this purpose, the warp and weft yarns are thermoplastic yarns.

Several solutions are known for cutting into carpet tiles or carpet strips. The cutting can be done with traditional scissors, either automated or not, or with a rotary cutting blade, preferably of circular shape or of any other suitable shape, or an ultrasonic cutting machine, or by means of a filament or heated knife, wherein the filament or heated knife cuts the carpet tiles or strips by melting or by a laser.

Because of the filament or heated knife or the laser, some of the warp and weft yarns are then at least partially melted into one another at the edge of the carpet tiles or the carpet strips. This further strengthens the cut edge and further reduces the cut-edge fraying. It is not necessary to reinforce the edges of the carpet tiles or carpet strips with a stitch or a layer of additional glue or a covering on the edge, so that the weight is reduced.

Alternatively, after cutting into carpet tiles or carpet strips using for example traditional scissors, a rotary cutting blade, or an ultrasonic cutting machine, some of the warp and weft yarns are at least partially melted into one another on the edge of the carpet tiles or carpet strips using a filament, a heated knife, a laser or any other suitable device. Therefore, the same edge-enhancing effect is achieved that when using a heated filament or knife or a laser for cutting up to carpet tiles or carpet strips.

According to one embodiment, the method comprises the additional step during lamination of laminating a polyester membrane on the back face of the machine-woven fabric.

The lamination of the membrane on the back face of the machine-woven fabric is carried out after the application of the synthetic latex coating to the back face of the fabric. Due to the lamination of the membrane to the back face of the fabric, the dimensional stability of the carpet tile or carpet strip is increased in all directions parallel to the usage surface of the carpet tile or carpet strip.

According to another embodiment, the lamination of the membrane comprises the use of the polyester as adhesive. This guarantees that the carpet tile or carpet strip is completely recyclable.

According to one embodiment, during the machine-weaving of the fabric, at least one series of tension warps and a series of bonding warps are provided as warp yarns, wherein a pre-stress on the tension warps and the bonding warps is adjusted, so that for the bonding warps and the tension warps, a different length is obtained per unit length of the fabric. A unit of length of the fabric is in the direction of the warp yarns. A ratio of the length of the bonding warps relative to the length of the tension warps per unit of length of the fabric is greater than 1.20, preferably greater than 1.35 and even more preferably greater than 1.50. This embodiment is advantageous to avoid visible cut edges formed by the straightened warp yarns, such as in an embodiment of the carpet tile or carpet strip described above.

In a third aspect, the invention relates to the manufacture of a carpet tile or carpet strip according to the first aspect, using a method according to the second aspect.

It will be clear for the person skilled in the art that a carpet tile or carpet strip according to the present invention can be used not only in office and commercial buildings, but also in other buildings such as hospitals, schools, and even houses.

The present invention is now described in greater detail with reference to the non-limiting examples or figures.

DESCRIPTION OF THE FIGURES

FIG. 1 shows a cross-sectional view of one embodiment of the present invention.

A polyester carpet tile or carpet strip comprises a needled felt 1, which is laminated to a smooth fabric 6 by means of an intermediate layer 2. The intermediate layer 2 comprises a polyester adhesive. The smooth fabric 6 comprises a first group of warp yarns 3 and a second group of warp yarns 4. The warp yarns 3 and 4 are juxtaposed alternately in the longitudinal direction of the fabric. The smooth fabric 6 comprises weft yarns 5. The weft yarns 5 are located transversely on the direction of the warp yarns 3 and 4. A first weft yarn 5 is located below the warp yarns 3 and above the warp yarns 4. The weft yarn 5 is then located above the warp yarns 3 and below the warp yarns 4. The fabric is then formed in this way. The bond obtained is a flat bond. A weft rep can be obtained in a similar manner if groups of two warp yarns 3 and groups of two warp yarns 4 are juxtaposed alternately in the longitudinal direction of the fabric. On the back face of the smooth fabric 6, a synthetic latex coating 7 is applied. The synthetic latex coating 7 is penetrated into the smooth fabric 6 from the back face of the smooth fabric 6 to a depth of at least 50% of a perpendicular distance between the back face and the front face of the smooth fabric 6. In this way, at least the warp yarns 3 and 4 are bonded to the back face of the smooth fabric 6.

Figure 2:
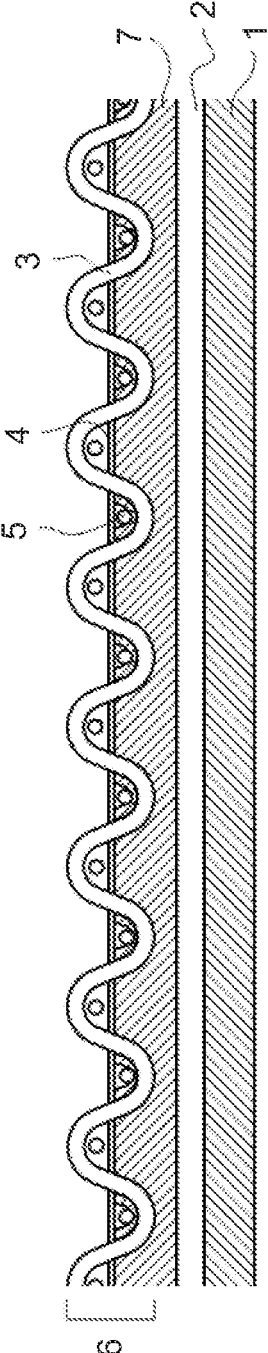
FIG. 2 shows a cross-sectional view of an alternative embodiment of the present invention.

FIG. 2 shows a cross-sectional view of one alternative embodiment of the present invention.

The polyester carpet tile or carpet strip of FIG. 2 is similar to the carpet tile or the carpet strip of FIG. 1. The warp yarns 3 and 4 comprise bonding warps 3 and tension warps 4. The tension warps 4 are more constrained than the bonding warps 3.

The bonding warps 3 and the tension warps 4 have a different length per unit of length of the smooth fabric 6. The ratio of the length of the bonding warps 3 to the length of the tension warps 4 per unit of length of the fabric 6 is greater than 1.20. This offers a structure wherein the synthetic latex coating 7 is penetrated into the fabric from the back face of the smooth fabric 6 guaranteed to at least 50% of the depth of the smooth fabric 6.

Figure 3:
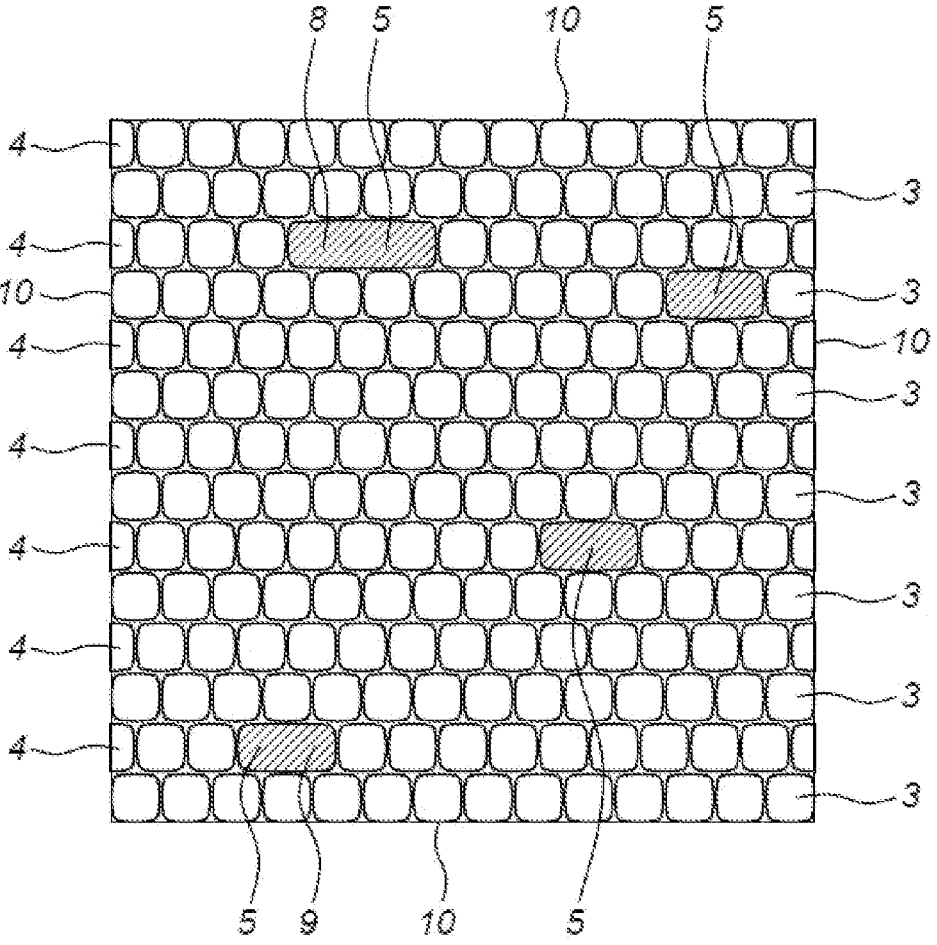
FIG. 3 shows a top view of one embodiment of the present invention.

FIG. 3 shows a top view of one embodiment of the present invention.

A polyester carpet tile comprises a needled felt 1, which is laminated to a smooth fabric 6 by means of an intermediate layer 2. The smooth fabric 6 comprises a first group of warp yarns 3 and a second group of warp yarns 4. The warp yarns 3 and 4 are juxtaposed alternately in the longitudinal direction of the fabric. The smooth fabric 6 comprises weft yarns 5. The weft yarns 5 are located transversely on the direction of the warp yarns 3 and 4. A first weft yarn 5 is located below the warp yarns 3 and above the warp yarns 4. The weft yarn 5 is completely hidden by the warp yarns 3, and the warp yarns 4 are completely hidden by the warp yarns 3 and the weft yarns 5. The weft yarn 5 is then located above the warp yarns 3 and below the warp yarns 4. The weft yarn 5 is completely hidden by the warp yarns 4, and the warp yarns 3 are completely hidden by the warp yarns 4 and the weft yarns 5. The fabric is then formed in this way. The bond obtained is a flat bond.

In certain locations, the smooth bond has been deflected locally. The upper float 9 is formed by a bonding pattern with a warp:weft bonding density of 2:1. The weft yarn 5 floats above two warp yarns 4. The upper float 8 is formed by a bonding pattern with a warp:weft bonding density of 3:1. The weft yarn 5 floats above three warp yarns 4.

On the back face of the smooth fabric 6, a synthetic latex coating 7 is applied. The synthetic latex coating 7 is penetrated into the smooth fabric 6 from the back face of the smooth fabric 6 to a depth of at least 30% of a perpendicular distance between the back face and the front face of the smooth fabric 6. In this way, at least the warp yarns 3 and 4 are bonded to the back face of the smooth fabric 6.

It is clear for the person skilled in the art that this example also applies to carpet strips.

EXAMPLES

The invention will now be described using the following example, without being limited thereto.

The example relates to an embodiment of a carpet tile or carpet strip made of polyester for the contract market, more particularly of office and commercial buildings, according to the invention. The carpet tile or carpet strip comprises a smooth fabric, an intermediate layer and a needled felt.

Both the smooth fabric and the needled felt comprise flame-retardant polyester. The intermediate layer comprises a polyester adhesive. On the back face of the smooth fabric, a polyester synthetic latex coating is applied. Therefore, the carpet tile or carpet strip is 100% recyclable simply after it has been replaced by a new carpet tile or carpet strip in the office or commercial building.

The needled felt is a nonwoven textile. On the raised floor or floor surface in the office or commercial building, velcro strips of the HTH577 type are glued. The many detached filament ends or loops in the needled felt are hooked into the hooks of the velcro strip. Therefore, the carpet tile or carpet strip can quickly be installed, but also replaced on the floor surface or raised floor. The carpet tile or carpet strip must simply be torn away from the velcro strips and the new carpet of belt or carpet strip must be adhered to the velcro tape. There is no adhesive residue on the floor surface or raised floor that must be removed. There is also no adhesive residue on the needled felt, which simplifies recycling. It is clear for the person skilled in the art that the carpet tiles or carpet strips according to the present invention can also be installed by means of glue, a double-sided adhesive or simply detached from the floor surface or raised floor.

The fabric comprises thermoplastic warp and weft yarns with a yarn number of 2200 dtex. The yarns have an average elongation at break of 30% and a minimum tensile strength of 3 g/den, tested according to ISO 2062. The average boiling water shrinkage of the yarns rises, according to the ISO 12590 standard, to 1.5% on average. There are 17 warp yarns per cm of fabric and 5 weft yarns per cm of fabric. This offers a strong fabric, which is also lightweight. The weight of the fabric is limited to 570 g/m$^2$.

The synthetic latex coating has a weight of 250 g/m$^2$.

To the back face of the smooth fabric, a polyester synthetic latex coating is applied, wherein the synthetic latex coating is penetrated into the fabric from the back face of the fabric to a depth equal to 55% of the perpendicular distance between the back face and the front face of the fabric. This reinforces the smooth fabric and increases the dimensional stability. During the cutting into carpet tiles or carpet strips, the edges will not fray or almost will not. Also, during the custom cutting or the cutting of shapes from the carpet tiles or carpet strips during installation, the carpet tile or the carpet strip will not fray or will fray less. Cut edges are not or are almost not visible.

The warp and weft yarns are less movable relative to one another, which leads to less friction between the warp and weft yarns and thus also less wear during the everyday stress from people moving through the office or commercial building and from carts. Because the fabric is stronger and has greater dimensional stability following the application of the synthetic latex coating to the back face of the fabric, a lighter intermediate layer can be used. The weight of the intermediate layer is limited to 300 g/m$^2$.

The carpet tiles or carpet strips are cut from the carpet using a laser. Part of the weft yarns and part of the warp yarns are then at least partially melted into one another. This further strengthens the cut edge and further reduces the cut-edge fraying. It is not necessary to reinforce the edges of the carpet tiles or carpet strips with a stitch or a layer of additional glue or a covering on the edge, so that the weight is reduced.

The needled felt is suitable for giving the required dimensional stability for the carpet tile or carpet strip. The needled felt is suitable for increasing the walking comfort of people moving through the office or commercial building and for serving as sound insulation. Because the fabric is stronger following the application of the synthetic latex coating to the back face of the fabric, the fabric already has a certain dimensional stability. Therefore, it is possible to use a thinner needled felt for the carpet tile or carpet strip. The needled felt has a maximum weight of 125 g/m$^2$. The total weight per unit area of the carpet tile or of the carpet strip is then 1245 g/m$^2$.

The carpet tile or carpet strip was tested according to the FAR 25.853 standard regarding flammability, more particularly FAR 25.853(A)-App.F Part I para (a)(1)(ii) Measurement of flammability of aircraft material. The test was carried out in a cabinet sheltered from the air stream, in accordance with the "Federal Test Method Standard 191, Method 5903.2". Three samples 75 mm over 305 mm of the carpet tile or carpet strip were exposed for 60 s to a flame of a Bunsen burner with a temperature of at least 843° C. The samples were suspended vertically in their longitudinal direction at 20 mm above the tip of the Bunsen burner. The flame of the Bunsen burner has a height of 40 mm measured from the tip of the Bunsen burner. The carpet tile or carpet strip were then burned on average for a maximum of 2 s over a length and width of less than 80 mm. There was no burning portions of the carpet tile or carpet strip that fell down. Therefore, the carpet tile or carpet strip meets the standard, which requires that, after removing the flame, the carpet tile or carpet strip continues to burn for a maximum of 15 s, that the carpet tile or carpet strip burns over a maximum length of 152 mm and that falling portions in drops of the carpet tile or carpet strip burn for a maximum of 5 s.

The carpet tile or carpet strip at least meets the requirements for the classification Cfl-s1 according to the EN 13501-1 2007 fire standard.

The carpet tile or carpet strip was subjected to a Vetterman test and a Lisson test. The Vetterman test simulates wear under laboratory conditions. The Lisson test determines the mass loss and the bonding of the fibers or yarns, after the carpet tile or carpet strip has been subjected to a prescribed number of double passes of a quadruped wheel. For both tests, the carpet tile or carpet strip obtained the highest rating of 33, which means that it is suitable for heavy intensive use. The carpet tile or carpet strip was also tested according to and adheres to the EN 15114 standard for determining shear strength, the EN 985 standard regarding the office chair test method, the ISO 6356 standard regarding static electricity propensity in textile and laminate floor coverings and the ISO 2551 standard for determining dimensional changes due to the effects of varied water and heat conditions. Compliance with all these standards guarantees that the carpet tile or carpet strip is suitable for the daily heavy load of people moving through the office or commercial building and carts.

The invention claimed is:

1. A carpet tile or carpet strip for the contract market comprising:
  a machine-woven fabric comprising a front face as a usage surface and a back face, comprising flame-retardant polyester warp and weft yarns;
  a polyester synthetic latex coating applied onto the back face of the machine-woven fabric;
  a needled felt of flame-retardant polyester;
  an intermediate layer comprising a polyester adhesive, wherein the intermediate layer is disposed between the needled felt and the machine-woven fabric, and wherein the intermediate layer at least partially adheres the needled felt layer to the synthetic latex coating;
  wherein the synthetic latex coating is penetrated into the machine-woven fabric from the back face of the fabric to a depth equal to at least 30% and at most 80% of the perpendicular distance between the back face and the front face of the fabric;
  the synthetic latex coating having a weight of at most 350 g/m²; and
  wherein the synthetic latex coating penetrates the machine-woven fabric so that at least some of the weft yarns are bonded to at least some warp yarns by the polyester synthetic latex coating.

2. The carpet tile or carpet strip according to claim 1, wherein the yarn number of the warp and weft yarns is from 1100 dtex to 4400 dtex.

3. The carpet tile or carpet strip according to claim 1, wherein the number of warp yarns per cm of fabric is 6 to 30 and the number of weft yarns per cm of fabric is 3 to 10.

4. The carpet tile or carpet strip according to claim 1, wherein the weight of the carpet tile or carpet strip is at most 2500 g/m2.

5. The carpet tile or carpet strip according to claim 1, wherein the machine-woven fabric and the needled felt are laminated together using the intermediate layer.

6. The carpet tile or carpet strip according to claim 1, wherein the weft and warp yarns comprise filaments, wherein a filament has a weight number of 2 DPF to 35 DPF.

7. The carpet tile or carpet strip according to claim 1, wherein the warp yarns comprise at least a series of tension warps and a series of bonding warps, wherein the bonding warps and the tension warps have a different length per unit of length of the fabric, wherein the ratio of the length of the bonding warps to the length of the tension warps per unit of length of the fabric is greater than 1.20.

8. The carpet tile or carpet strip according to claim 1, wherein the carpet tile or carpet strip comprises a polyester membrane between the machine-woven fabric and the intermediate layer.

* * * * *